United States Patent
Bi et al.

(10) Patent No.: US 7,558,196 B2
(45) Date of Patent: Jul. 7, 2009

(54) METHOD AND APPARATUS FOR SYSTEM RESOURCE MANAGEMENT IN A COMMUNICATIONS SYSTEM

(75) Inventors: Qi Bi, Morris Plains, NJ (US); Patrick Li, Mendham, NJ (US); Stanley Vitebsky, Parsippany, NJ (US); Yang Yang, Princeton, NJ (US); Lily Zhu, Parsippany, NJ (US); Carol Picot, Boonton, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1841 days.

(21) Appl. No.: 10/117,102

(22) Filed: Apr. 8, 2002

(65) Prior Publication Data

US 2003/0189951 A1    Oct. 9, 2003

(51) Int. Cl.
H04J 3/14 (2006.01)
H04L 12/26 (2006.01)
G06F 13/00 (2006.01)
G06F 15/16 (2006.01)

(52) U.S. Cl. ............... 370/230; 370/253; 370/349; 370/389; 709/224; 709/227

(58) Field of Classification Search ............... 370/230, 370/253, 349, 389; 709/224, 227
See application file for complete search history.

(56) References Cited

U.S. PATENT DOCUMENTS

| | | | | |
|---|---|---|---|---|
| 5,027,269 A * | 6/1991 | Grant et al. | ............... | 709/224 |
| 6,105,064 A * | 8/2000 | Davis et al. | ............... | 709/224 |
| 6,115,357 A * | 9/2000 | Packer et al. | ............... | 370/231 |
| 6,125,177 A * | 9/2000 | Whittaker | ............... | 379/243 |
| 6,269,402 B1 * | 7/2001 | Lin et al. | ............... | 709/227 |
| 6,336,135 B1 * | 1/2002 | Niblett et al. | ............... | 709/215 |
| 6,401,127 B1 * | 6/2002 | Lei et al. | ............... | 709/235 |
| 6,477,373 B1 * | 11/2002 | Rappaport et al. | ............... | 455/436 |
| 6,477,590 B1 * | 11/2002 | Habusha et al. | ............... | 710/29 |
| 6,724,732 B1 * | 4/2004 | Abrams et al. | ............... | 370/252 |
| 6,791,945 B1 * | 9/2004 | Levenson et al. | ............... | 370/235 |
| 6,882,637 B1 * | 4/2005 | Le et al. | ............... | 370/349 |
| 6,917,587 B1 * | 7/2005 | Sarkar et al. | ............... | 370/230 |
| 6,990,070 B1 * | 1/2006 | Aweya et al. | ............... | 370/230 |
| 2002/0161914 A1 * | 10/2002 | Belenki | ............... | 709/235 |
| 2003/0016627 A1 * | 1/2003 | MeLampy et al. | ............... | 370/235 |
| 2005/0008019 A1 * | 1/2005 | Berger et al. | ............... | 370/395.1 |

* cited by examiner

Primary Examiner—Alpus H Hsu

(57) ABSTRACT

The method and apparatus adaptively adjust a timer based at least on the frequency of transmitted/received packets and the traffic arrival pattern in a data session in the communication system. The expiration of the timer indicates to suspend the data session in the communication system.

15 Claims, 3 Drawing Sheets

METHOD AND APPARATUS FOR SYSTEM RESOURCE MANAGEMENT IN A COMMUNICATIONS SYSTEM

BACKGROUND OF THE INVENTION

1. Field of the Invention

The present invention relates to telecommunication systems, and more particularly, to resource management in telecommunication systems.

2. Related Art

Major cellular telecommunication system types include those operating according to the Global Services for Mobile (GSM) Standard, the TLA/EIA/IS-95 Mobile Station-Base Station Compatibility Standard for Dual Mode Wideband Spread Spectrum Cellular Systems (IS-95), the TIA/EIA/IS-136 Mobile Station-Base Station Compatibility Standard (IS-136), the TIA/EIA/IS-707 Spread Spectrum cdma2000 Standard (IS-2000), and the TIA/EIA 553 Analog Standard (AMPS/TACS). Other major cellular systems include, but are not limited to, those operating in the personal communications system (PCS) band according to the IS-95 based ANSI-J-STD-008 1.8-2.0 GHz standard, or those operating according to the GSM based PCS 1900 (1900 MHz frequency range) standard.

Currently, each of the major cellular system standards is implementing data services into its digital cellular specification. For most of the standards, the data service specifications have been finalized, or are being finalized.

One data service specification includes a radio link protocol (RLP) that is utilized to provide an octet stream service over forward and reverse traffic channels. The octet stream service carries variable length data packets of the point-to-point protocol layer. The RLP divides the point-to-point protocol packets into traffic channel frames for transmission. The traffic channel frames form the physical layer transmission frames. There is no direct relationship between the point-to-point protocol packets and the traffic channel frames. A large packet may span several traffic channel frames, or a single traffic channel frame may include all or part of several point-to-point packets. The RLP does not take the higher level traffic channel framing into account but operates on a featureless octet stream, delivering the octets to the system multiplex sublayer for transmission in the order the octets are received from the point-to-point layer. The data may be transmitted on the traffic channel as primary traffic or, for example, along with speech, as secondary traffic. The RLP generates and supplies one frame to the multiple sublayer every 20 milliseconds (ms). The size of the RLP frame depends on the type and size of the transmission frame available for transmitting the RLP frame.

The foregoing is but one example of the data transmission protocol layer in a major cellular system standard, for use in transmission of data and data packets. Other standards also have similar data transmission protocols used for transmission of data packets.

The majority of the data transmission protocols include a finite timer for insuring data transmission sessions do not dominate system resources. For example, once a data transmission session is established, the timer is activated to measure an amount of time elapsed between consecutively received/transmitted data packets. That is, after a first packet is received/transmitted, the finite timer is started. If a subsequent packet is not received/transmitted before the timer expires, the telecommunication system will terminate the data session in favor of freeing up resources for use by other data or speech sessions.

Although the use of a timer in telecommunications systems insures system resources are not unnecessarily dominated by one or more data sessions, the use of a uniform timer does not take in consideration data sessions that may have packets that are generated in a substantially periodic nature. Such data sessions may include but are not limited to heart beat retrieval systems that access weather, traffic, stock, etc., information. Typically, these types of data sessions require a very small amount of time for packet transmission, which leads to a data session being unnecessarily maintained until a finite timer value expires.

SUMMARY OF THE INVENTION

An embodiment of the present invention is a process for improving resource usage in a communication system. The process evaluates the measured time between receipt of packets in a data session to adjust a timer value in accordance therewith. The timer value is determinative of when the communication system initiates suspension of the data session in order to release communication system recourses for use by other users of the communication system.

Yet another embodiment of the present invention is an apparatus for improving resource use in a communication system. The apparatus includes hardware elements to adjust a timer value to ensure efficient use of the communication system resources.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
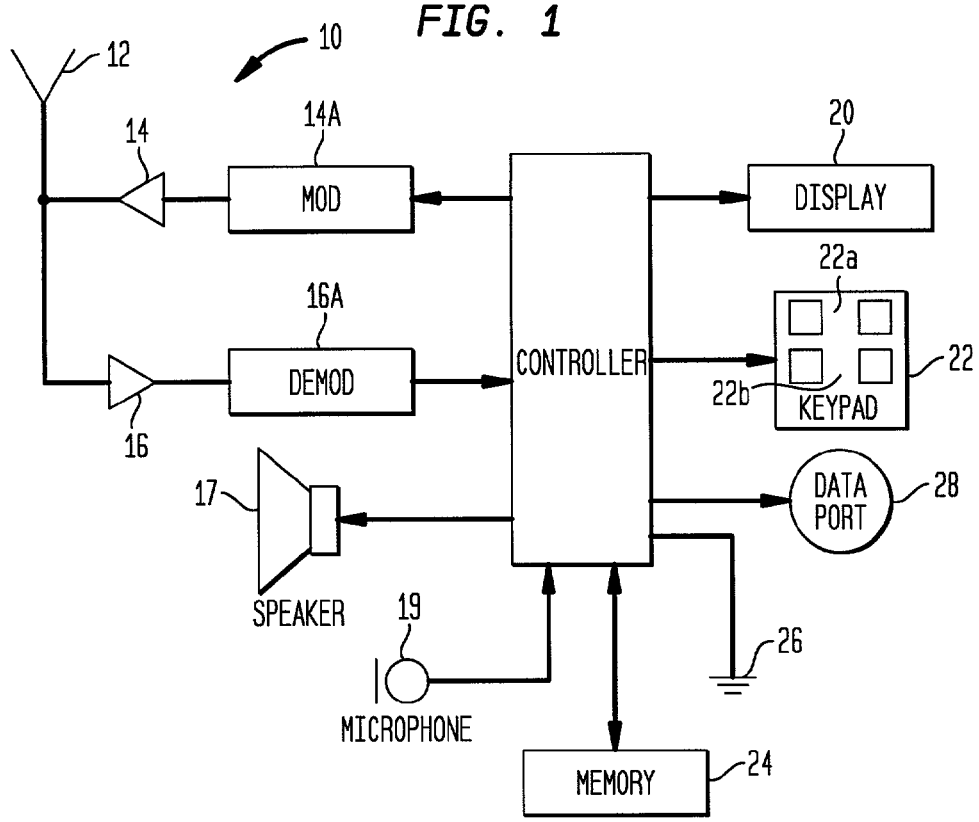
FIG. 1 is a block diagram of a cellular terminal that is suitable for practicing an embodiment of the present invention.
Figure 2:
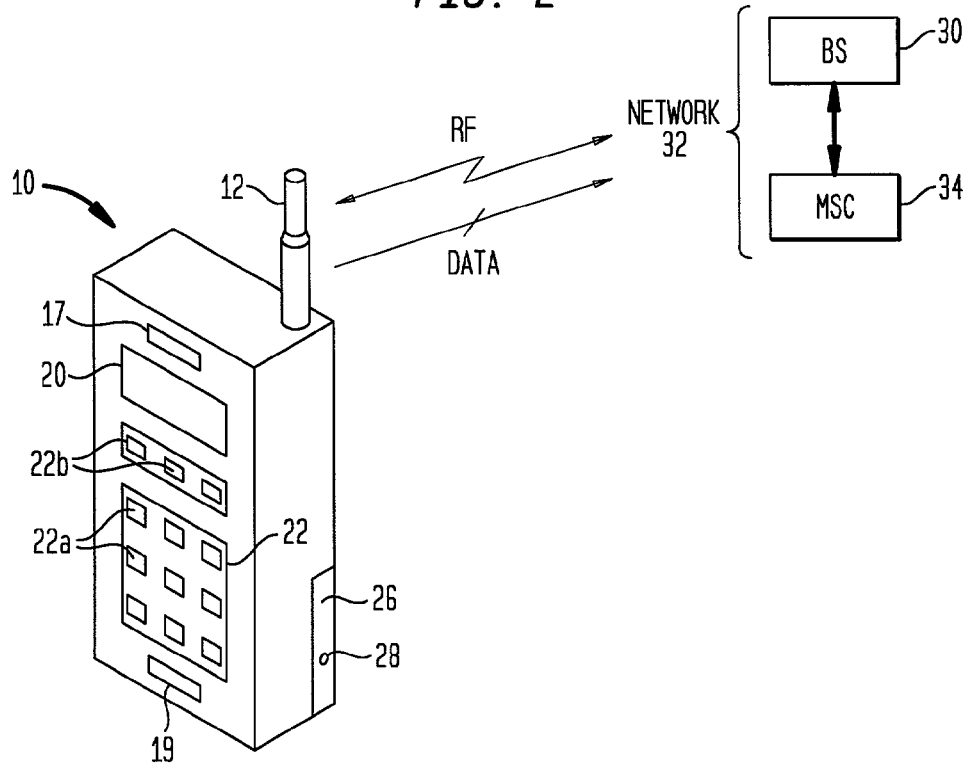
FIG. 2 depicts the terminal illustrated in FIG. 1 in communication with a wireless network.

FIGS. 1 and 2, illustrate a wireless user terminal or mobile station (MS) 10 and a wireless network 32 that are suitable for practicing an embodiment of the present invention. The MS 10 includes an antenna 12 for transmitting signals to and receiving signals from a base site or a base station (BS) 30. The BS 30 is a part of the wireless network 32 that includes a mobile switching center (MSC) 34. The MSC 34 provides a connection to, for example, landline trunks when the MS 10 is involved in a communications session.

The MS 10 includes a modulator (MOD) 14a, a transmitter 14, a receiver 16, demodulator (DEMOD) 16a, and a controller 18 that provides signals to and receives signals from the modulator 14a and the demodulator 16a, respectively. These signals may include signaling information and also speech, data and/or packet data transmitted between the MS 10 and the BS 30 in accordance with the air interface standard of the applicable wireless system.

The controller 18 may include a digital signal processor device, a microprocessor device and various analog-to-digital converters, digital-to-analog converters, and other support circuitry. The control and signal processing functions of the MS 10 are allocated between these devices according to their respective capabilities. The MS 10 also includes a user interface having a conventional earphone or speaker 17, a conventional microphone 19, a display 20, a user input device, typically a keypad 22, all of which are coupled to the controller 18. The keypad 22 includes conventional numeric (0-9) keys and related keys (#, *) 22a, and other keys 22b used for operating the MS 10. These other keys 22b may include, for example, a send key, various menus scrolling soft keys, and a power key. The MS 10 may also include a battery 26 for powering the various circuits that are required to operate the MS 10.

The MS 10 also includes various memories shown collectively as memory 24. The memory 24 includes stored therein a plurality of constants and variables that are used by the controller 18 during an operation of the MS 10. For example, the memory 24 may store the values of various wireless system parameters. An operating program for controlling the operation of the controller 18 is also stored in the memory 24. Furthermore, the memory 24 may also store or buffer data prior to transmission or after reception.

The MS 10 may also function as a data terminal for transmitting or receiving packet data. As such, in this case, the MS 10 may be connected to a portable computer or a fax machine through a suitable data port (DP) 28. Alternatively, the MS 10 may include relevant operating keys and/or software for access to a data network such as the Internet and and/or and an email server.

The BS 30 also includes the necessary transmitters and receivers to allow signal exchange with the MS 10. Controllers, processors and associated memories that may be located in the BS 30 or the MSC 34 provide control of the BS 30 and the MSC 34 and implement the method and apparatus in accordance with the embodiments of the present invention.

Figure 3:
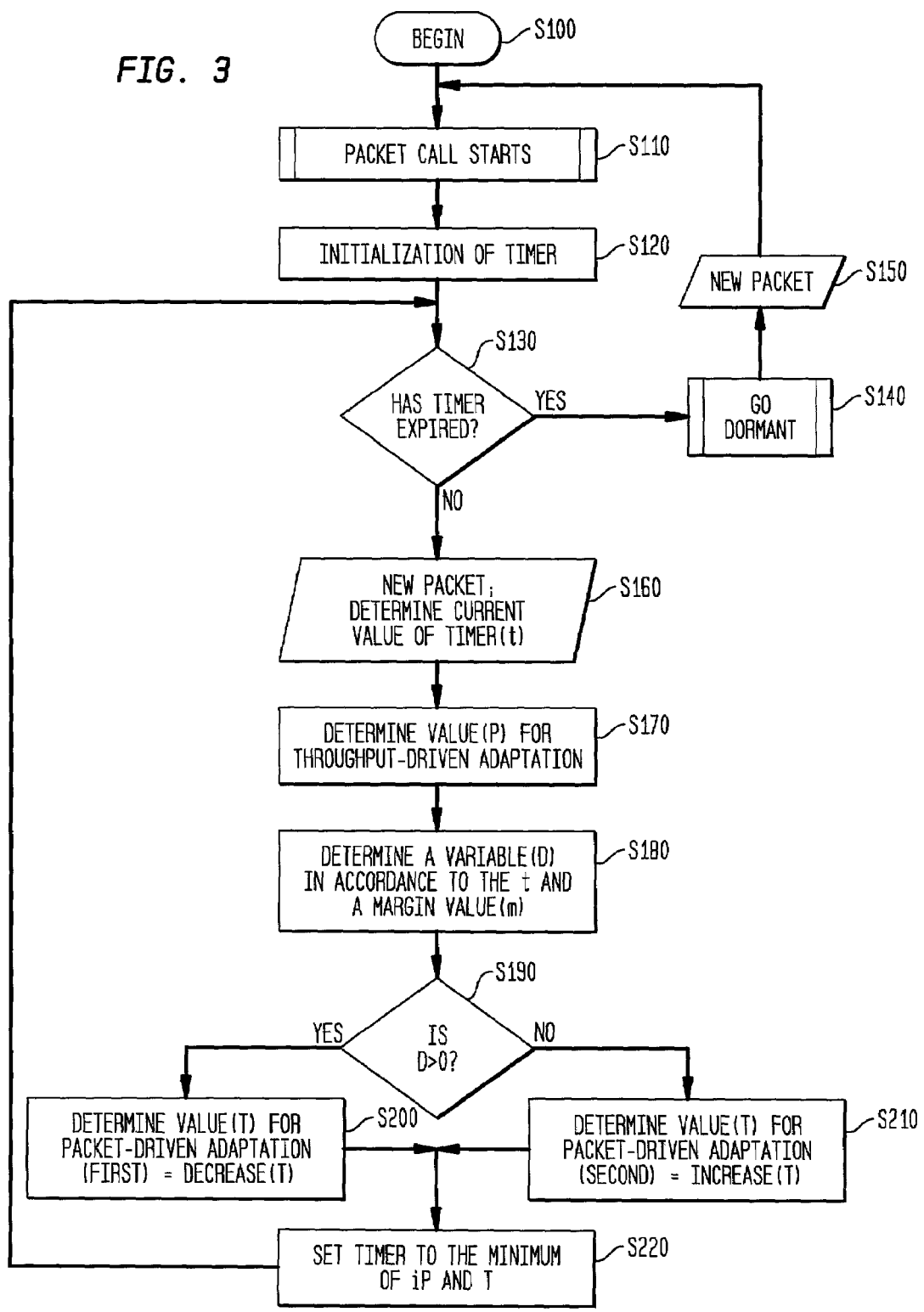
FIG. 3 is a flowchart illustrating process steps according to an embodiment of the present invention.

FIG. 3 illustrates a flowchart of process steps in accordance with an embodiment of the present invention. The software and/or hardware for implementing the process steps illustrated in FIG. 3 are collectively located in the controllers, processors and/or associated memories of the BS 30 and/or MSC 34. However, it is also possible that the MS 10 includes the software and/or hardware capable of implementing the process steps illustrated in FIG. 3. Moreover, it is advantageous for the MS 10 to include the software and/or hardware for implementing the process steps. This would reduce radio link time; thereby avoiding having to charge the user of the MS 10 while the MS 10 is not transmitting data. Advantageously, the process may be integrated with the data transmission protocol of the communications system the embodiment is employed in.

Provided hereinbelow is a table (TABLE 1) that provides examples of certain variables discussed. It should be understood that the values listed in TABLE 1 are only examples of values that may be used with the present invention.

A terminator indicates the beginning of the process according to one embodiment of the present invention (S100). The next step is the initiation of a packet call (S110). The packet call step S110 represents an establishment of a packet data session by the MS 10 with the wireless network 32. Once the packet data session is established, a timer, or a dormancy timer, is initialized after a first data packet is sent/received in the data session (S120). The timer is initialized by choosing a minimum of a through-put timer value (P) set from an initial through-put timer value (r) and a packet-driven timer value (T) set from a maximum timer value (Tmax)

$$\text{Timer}=\min(P, T)$$

This initialization of the timer takes place in one of the MS 10 and the network 32. In particular, it may be advantageous for the MSC 34 to process the initialization of the timer in step S120. Next, it is determined whether the timer has expired since the data packet was sent in the data session (S130). If the timer has expired, since the transmission of the data packet, the data session is rendered dormant (S140). A data session (e.g. a point-to-point protocol (PPP) session) is rendered dormant or suspended if the radio link is taken down temporarily. The data session will remain dormant until an additional packet is sent by the MS 10 (S150). Once the additional packet is sent, the timer is reinitialized (S120).

However, in step S130, if it is determined that the timer has not expired, the process according to an embodiment of the present invention progresses to step S160. In step S160, a value that is derived from the current value of the unexpired timer, also called a current packet inter-arrival time, is saved as a value (t). For example, if the timer value is set to 15 seconds, and the timer counts down from 15 to 0 seconds, if the timer value is currently at 12 seconds then the value t would be 3 seconds. Alternatively, if the timer counts up from 0 to 15 seconds, and the timer value is currently at 12 seconds, then the value t would be 3 seconds also.

Next, a through-put driven adaptation is used to choose a new value for the through-put timer value (P) (S170). The value P is determined based on a minimum of the initial value for a through-put timer value P summed with a target average packet inter-arrival time value (N) less the value t, and the upper bound of P: $P_{max}$ $$\text{Through-put driven adaptation}=P=\min(P+N-t, P_{max})$$

Next, a decision value (D), which is equal to the timer less the value t and further less a locality margin of the timer value (M) is determined (S180)

$$D=(\text{Timer}-t-M)$$

If the value D is greater than zero (S190) the packet-driven timer value T is revised in accordance with a first packet-driven adaptation (S200). On the other hand, if D is less than zero (S190), then the packet-driven timer value T is revised in accordance with a second packet-driven adaptation (S210)

$$\text{First packet-driven adaptation}=T=(T-d1*D), \text{ and}$$

$$\text{Second packet-driven adaptation}=T=\min(T+d2*(2C-T)*(-D), T_{max}),$$

where d1 is an incremental decrease timer value, d2 is an incremental increase timer value, $T_{max}$ is the maximum timer value, and C is a normalized data session suspension/reactivation cost factor value. Finally, the timer is reset to equal a minimum of the determined value P and the determined T (S220).

TABLE 1 hereinbelow lists proposed values for the variables discussed in connections with the process of FIG. 3. These values may be modified in accordance with the specific communications system employing the present invention.

TABLE 1

| Parameter | Explanation | Default Value | Impact of change |
|---|---|---|---|
| C | Normalized data session suspension/ reactivation cost for call release and reactivation process | 7.5 seconds | Bigger C => more conservative |
| M | Locality margin of timer | 3 seconds | Bigger M => more conservative |
| N | Target average packet interarrival time for chatty applications | 5 seconds | Bigger N => fewer chatty caught |
| d1 | Step size for timer reduction | 0.1 | Bigger d1 => more aggressive |
| d2 | Step size of timer increase | = d1/C = 0.013 | Bigger d2 => more conservative |
| $T_{max}$ | Maximum timer value | = 2*C = 15 seconds | Bigger $T_{max}$ => more conservative |
| r | Initial value for through-put timer | = N + 1 = 6 seconds | Bigger r => fewer chatty caught |
| $P_{max}$ | The upper bound of through-put driven timer | = 1000 | $P_{max}$ is used to prevent the integer from overflowing for non-chatty users |

Figure 4:
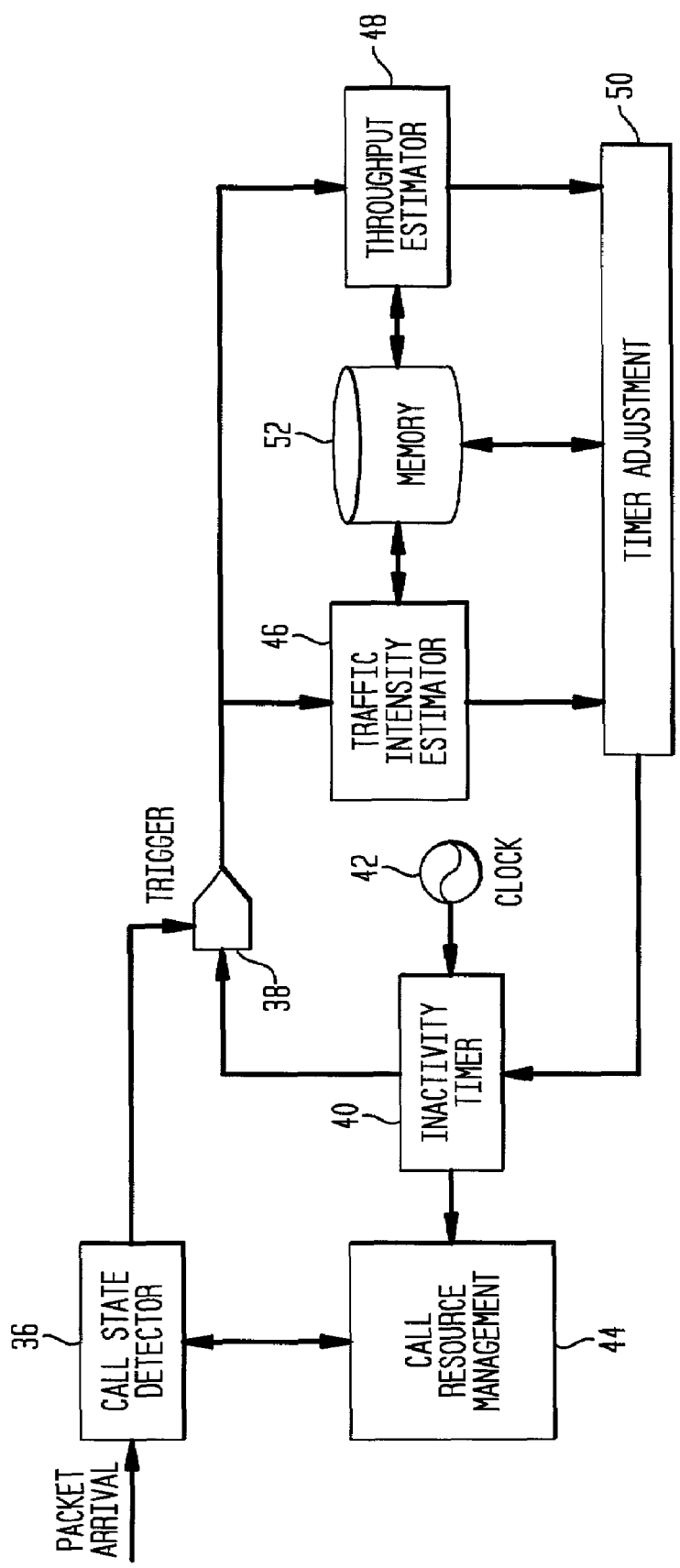
FIG. 4 is a block diagram of elements suitable for practicing an embodiment of the present invention in any communication system.

FIG. 4 illustrates a block diagram of elements for implementing a process according to the present invention. The block diagram illustrated in FIG. 4 shows hardware and/or software elements for implementing an embodiment of the present invention. These software/hardware elements may be located in the MS 10, BS 30 and/or MSC 34. Advantageously, the software/hardware elements may operate intimately or be integrated with the data transmission protocol of the communications system the elements are employed in.

As is illustrated in FIG. 4, a call state detector 36 is included for determining an arrival of a packet in an established data session. The call state detector 36 sends a signal to a trigger 38 indicating whether the data session is in dormant state or active state when a packet is received/transmitted. For the data session that is in dormant state, a packet arrival will result in the start of an inactivity timer 40. The inactivity timer 40 is connected to a clocking mechanism 42. The trigger 38 continues to receive signals from the call state detector 36 as an indication as to whether an additional packet has arrived in the data session. Moreover, the trigger 38 also receives signals from the inactivity timer 40 as to the current state or position of the timer 40. If the inactivity timer 40 expires before the receipt of an additional packet at the call state detector 36, a call resource management element 44 initiates a signal to the call state detector 36 to terminate or cause the current data session to go dormant.

On the other hand, if the trigger 38 detects a signal from the call state detector 36 that a packet has arrived before the inactivity timer 40 expires, both a traffic intensity estimator 46 and a through-put estimator 48 are referenced in order to cause a timer adjustment element 50 to send a timer update value signal to the inactivity timer 40. Calculations in the traffic intensity estimator 46 and the through-put estimator 48 are based on variables that are stored in a memory 52, along with other variables used in the system. These variables are discussed in detail with reference to the flow chart illustrated in FIG. 3. The relevant variables used by the through-put adaptation and the packet-driven adaptations, discussed in relation to FIG. 3, are those also used by the estimators 46 and 48.

The invention being thus described, it will be obvious that the same may be varied in many ways. Such variations are not to be regarded as a departure from the spirit and scope of the invention, and all such modifications as would be obvious to one skilled in the art.

We claim:

1. A method for management of resources in a communication system, comprising:
  measuring time between receipt of packets in a data session in the communication system; and
  adaptively adjusting a timer based at least on the measured time between receipt of packets in the data session in the communication system, expiration of the timer indicating to suspend the data session in the communication system.

2. The method according to claim 1, further comprising:
  determining a current value of the timer before adaptively adjusting the timer; and
  initiating adaptively adjusting the timer only if the timer has not expired.

3. The method according to claim 1, further comprising:
  determining a current value of the timer, wherein the current value of the timer at least partially affects the adjustment of the timer.

4. The method according to claim 1, wherein adaptively adjusting the timer further includes adjusting the timer using at least one tunable value.

5. The method according to claim 4, wherein at least one tunable value is a value determined based on a target average packet inter-arrival time.

6. The method according to claim 4, wherein adaptively adjusting the timer further includes adjusting the timer based on at least a current value of the timer before the timer elapses.

7. The method according to claim 4, wherein at least one tunable value is an upper limit value for the timer.

8. The method according to claim 4, wherein at least one tunable value limits the timer.

9. The method according to claim 1, wherein adaptively adjusting the timer includes choosing one of two values to modify the timer, each of the two values being calculated at least in part based on a current value of the timer before the timer elapses.

10. The method according to claim 9, wherein one of the two values increments the timer and the other of the two values decrements the timer.

11. The method according to claim 10, wherein the incrementing value is chosen to modify the timer.

12. The method according to claim 11, wherein the incrementing value is calculated further based on a cost factor determined based on costs associated with a suspension or reactivation of a data session.

13. The method according to claim 10, wherein the decrementing value is chosen to modify the timer.

14. The method according to claim 1, further comprising:
  adaptively adjusting the through-put timer based on the measured time between packets and a target average packet inter-arrival time;
  adaptively adjusting the packet-driven timer based on the through-put timer and the measured time between packets; and
  selecting either the through-put timer or the packet-driven timer based on which has the smallest timer value.

15. A method of resource management in a data transmission system, comprising:
   initializing a timer in accordance with a first variable and a second variable; receiving a data packet;
   determining a current timer value of the timer upon receiving the data packet;
   determining a through-put timer value based on at least the first variable, a target average packet inter-arrival time, and the current timer value;
   calculating a comparison value based on at least the timer, the locality margin timer value, and the current timer value; and
   choosing a packet-driven timer value in accordance with the comparison value; and
   updating the timer using the smaller value of the through-put timer value and the packet-driven timer value.

* * * * *